(12) United States Patent
Ginter

(10) Patent No.: US 9,734,237 B2
(45) Date of Patent: Aug. 15, 2017

(54) PROGRESSIVE ANALYSIS FOR BIG DATA

(71) Applicant: BMC Software, Inc., Houston, TX (US)

(72) Inventor: Jonathan Ginter, Montreal (CA)

(73) Assignee: BMC Software, Inc., Houston, TX (US)

( * ) Notice: Subject to any disclaimer, the term of this patent is extended or adjusted under 35 U.S.C. 154(b) by 584 days.

(21) Appl. No.: 13/731,211

(22) Filed: Dec. 31, 2012

(65) Prior Publication Data

US 2014/0101178 A1 Apr. 10, 2014

Related U.S. Application Data

(60) Provisional application No. 61/714,222, filed on Oct. 15, 2012, provisional application No. 61/711,189, filed on Oct. 8, 2012.

(51) Int. Cl.
*G06F 7/00* (2006.01)
*G06F 17/30* (2006.01)

(52) U.S. Cl.
CPC .. *G06F 17/30675* (2013.01); *G06F 17/30106* (2013.01); *G06F 17/30979* (2013.01)

(58) Field of Classification Search
CPC ......... G06F 17/30551; G06F 17/30979; G06F 17/30106; G06F 17/30675
USPC .................. 707/746, 752, 755, 728, 999.003
See application file for complete search history.

(56) References Cited

U.S. PATENT DOCUMENTS

| 7,461,059 | B2 * | 12/2008 | Richardson et al. |
| 7,937,344 | B2 | 5/2011 | Baum et al. |
| 8,112,425 | B2 * | 2/2012 | Baum ............... G06F 17/30551 707/746 |

OTHER PUBLICATIONS

"Apache Hadoop NextGen MapReduct (YARN)", The Apache Software Foundation, http://hadoop.apache.org/docs/current/hadoop-yarn/hadoop-yarn-site/YARN, 2011, 2 pages.
"Big data", Wikipedia article, http://en.wikipedia.org/wiki/Big_data, Dec. 15, 2012, 8 pages.
"BigQuery", Wikipedia article, http://en.wikipedia.org/wiki/BigQuery, Nov. 27, 2012, 2 pages.

(Continued)

*Primary Examiner* — Md. I Uddin
(74) *Attorney, Agent, or Firm* — Brake Hughes Bellermann LLP

(57) ABSTRACT

According to one general aspect, a method may include receiving a data query request that includes one or more search parameters to be searched for within a plurality of files that are stored according to a hierarchical organizational structure, wherein each file includes at least one data record. The method may include scanning a plurality of files to determine if one or more files match a sub portion of the search parameters. The method may further include parsing the candidate files to determine which, if any, records included by the respective candidate files meet the search parameters. The method may include generating, by one or more result analyzers, query results from the resultant data. The method may also include streaming, to the user device, the query results as at least one query result becomes available and to start streaming before the query requests have been fully generated.

19 Claims, 5 Drawing Sheets

(56) References Cited

OTHER PUBLICATIONS

"Database management system", Wikipedia article, http://en.wikipedia.org/wiki/Database_management_system, Dec. 10, 2012, 21 pages.
"Google BigQuery", Google Cloud Platform, https://cloud.google.com/products/big-query, Dec. 31, 2012, 2 pages.
"MapReduce Tutorial", hapdoop, http://hadoop.apache.org/docs/r0.20.2/mapred_tutorial.html#Walk-through, Feb. 19, 2010, 26 pages.
"Tutorial—nathanmarz/storm", Wiki—GitHub, https://github.com/nathanmarz/storm/wiki/Tutorial, 2012, 12 pages.
"Relational database management system", Wikipedia article, http://en.wikipedia.org/wiki/RDBMS, Dec. 14, 2012, 1 page.
"Splunk", Wikipedia article, http://en.wikipedia.org/wiki/Splunk, Dec. 11, 2012, 3 pages.
"Storm—Distributed and fault-tolerant realtime computation", http://storm-project.net, Dec. 31, 2012, 2 pages.
"Welcome to Apache Hadoop!", http://hadoop.apache.org, Dec. 5, 2012, 3 pages.
"Apache Hadoop", Wikipedia article, http://en.wikipedia.org/wiki/Hadoop, Dec. 17, 2012, 14 pages.

\* cited by examiner

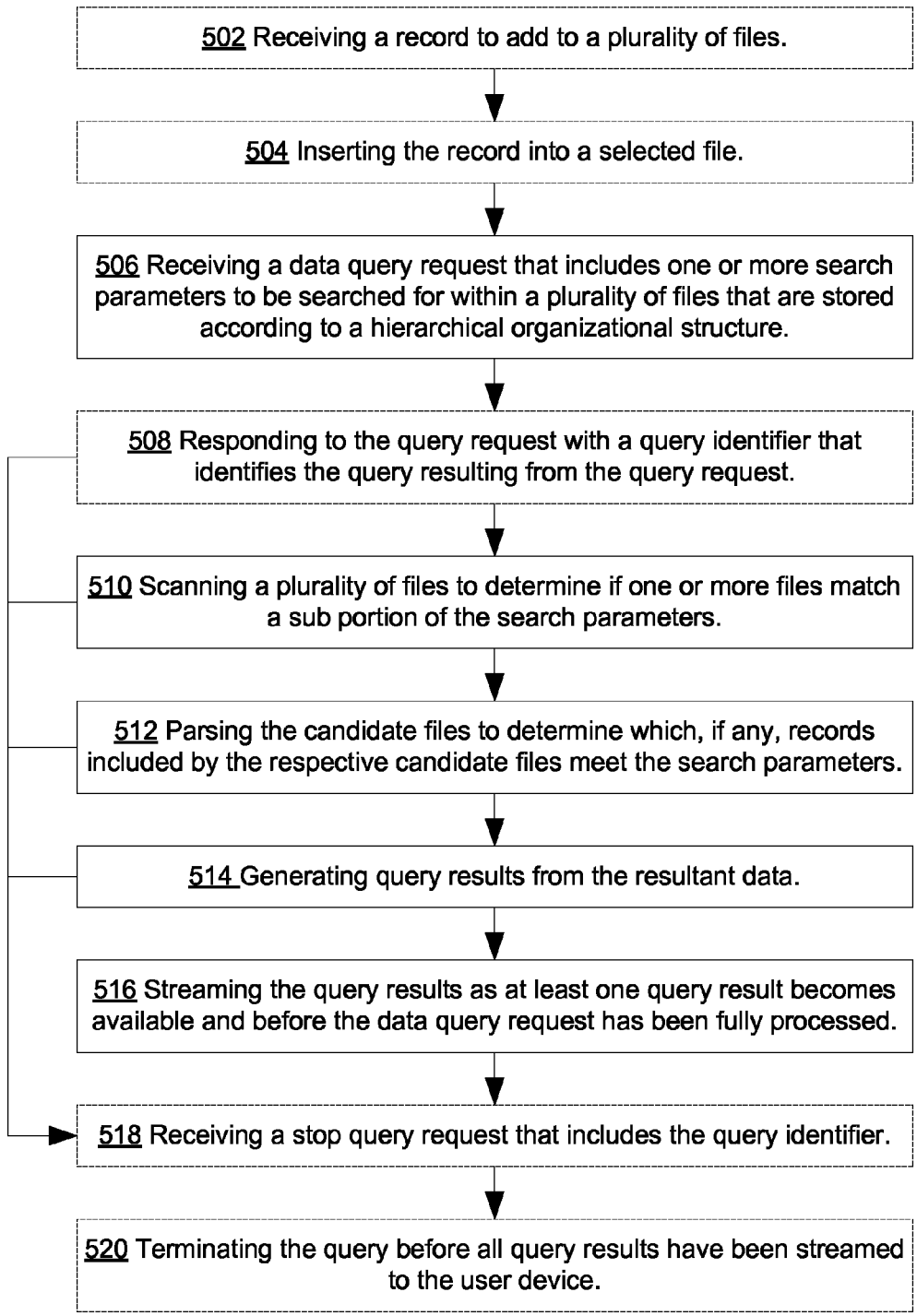

PROGRESSIVE ANALYSIS FOR BIG DATA

CROSS-REFERENCE TO RELATED APPLICATION

This application claims priority under 35 U.S.C. §119 to Provisional Patent Application Ser. No. 61/711,189, entitled "PROGRESSIVE ANALYSIS FOR BIG DATA" filed on Oct. 8, 2012 and Provisional Patent Application Ser. No. 61/714,222, also entitled "PROGRESSIVE ANALYSIS FOR BIG DATA" filed on Oct. 15, 2012. The subject matter of these earlier filed applications is hereby incorporated by reference.

TECHNICAL FIELD

This description relates to data or information management, and more specifically the storage and retrieval of data within a large set of data.

BACKGROUND

Generally, as more and more information is collected by companies and government agencies the storage and retrieval of the information becomes a greater problem. Often companies may store data on the order of petabytes (PBs) or larger. Colloquially information systems that store these very large amounts of data may be referred to as "Big Data".

Typically, massive high-volume data storage introduces significant obstacles when it comes to information management that "Big Data" solutions were meant to solve. Often such obstacles include one or more of: high-volume, high-speed insertions of data into the database, support for petabytes of stored data, purging strategies that can match the insertion speed, mutating schemas or data formats that cause expensive data migrations, and/or queries that treat every field as equally viable criteria. It is understood that the above are merely a few illustrative examples to which the disclosed subject matter is not limited.

Frequently, different solutions applied to the Big Data sector specialize in different aspects of these problems. However, these solutions generally all suffer from a common problem—that of responding quickly enough to queries as the data grows. In one example, the time a user waits between making a query request to the database and receiving the first data record returned as a result of the query (a.k.a. the time-to-first-result) degrades as the data set gets larger and larger.

For example, a company's web site (e.g., Salesforce.com, etc.) may produce about 1 terabyte (TB) of performance data per day and may expect the data acquisition rate to accelerate significantly year-over-year as the company grows its business. This company may desire to retain 15 months of that data in order to maintain visibility on annual and semi-annual operational events/patterns or for other reasons. However, the company may also desire to access a piece of data within 30 seconds of its insertion into the larger database or data set. Moreover, they may desire that queries be able to return useful results within 30 seconds or sooner, even though the queries might span the entire data set (e.g., >1 TB, >1 PB, hundreds of millions of records, etc.). It is understood that the above are merely a few illustrative examples.

SUMMARY

According to one general aspect, a method may include receiving, from a user device, a data query request that includes one or more search parameters to be searched for within a plurality of files that are stored according to a hierarchical organizational structure, wherein each file includes at least one data record. The method may include scanning a plurality of files to determine if one or more files match a sub portion of the search parameters, wherein scanning a plurality of files results in zero or more candidate files. The method may further include parsing the candidate files to determine which, if any, records included by the respective candidate files meet the search parameters, wherein scanning a plurality of files produces resultant data. The method may include generating, by one or more result analyzers, query results from the resultant data. The method may also include streaming, to the user device, the query results as at least one query result becomes available and to start streaming before the query requests have been fully generated.

According to another general aspect, an apparatus may include a processor and a network interface. The network interface may be configured to receive, from a user device, a data query request that includes one or more search parameters to be searched for within a plurality of files that are stored according to a hierarchical organizational structure, wherein each file includes at least one data record. The processor may be configured to scan a plurality of files to determine if one or more files match a sub portion of the search parameters, wherein scanning a plurality of files results in zero or more candidate files; parse the candidate files to determine which, if any, records included by the respective candidate files meet the search parameters, wherein scanning a plurality of files produces resultant data; and generate, via result analysis, query results from the resultant data. The network interface is also configured to stream, to the user device, the query results as at least one query result becomes available and before the query requests have been fully generated.

According to another general aspect, a computer program product for storing and providing information may be tangibly and non-transitorily embodied on a computer-readable medium. The computer program product may include executable code that, when executed, is configured to cause an apparatus to: receive, from a user device, a data query request that includes one or more search parameters to be searched for within a plurality of files that are stored according to a hierarchical organizational structure, wherein each file includes at least one data record; scan a plurality of files to determine if one or more files match a sub portion of the search parameters, wherein scanning a plurality of files results in zero or more candidate files; parse the candidate files to determine which, if any, records included by the respective candidate files meet the search parameters, wherein scanning a plurality of files produces resultant data; generate, via result analysis, query results from the resultant data; and stream, to the user device, the query results as at least one query result becomes available and before the query requests have been fully generated.

The details of one or more implementations are set forth in the accompanying drawings and the description below. Other features will be apparent from the description and drawings, and from the claims.

A system and/or method for data or information management, substantially as shown in and/or described in connection with at least one of the figures, as set forth more completely in the claims.

BRIEF DESCRIPTION OF THE DRAWINGS

FIG. 5 is a flowchart of an example embodiment of a technique in accordance with the disclosed subject matter.

Like reference symbols in the various drawings indicate like elements.

DETAILED DESCRIPTION

Figure 1:
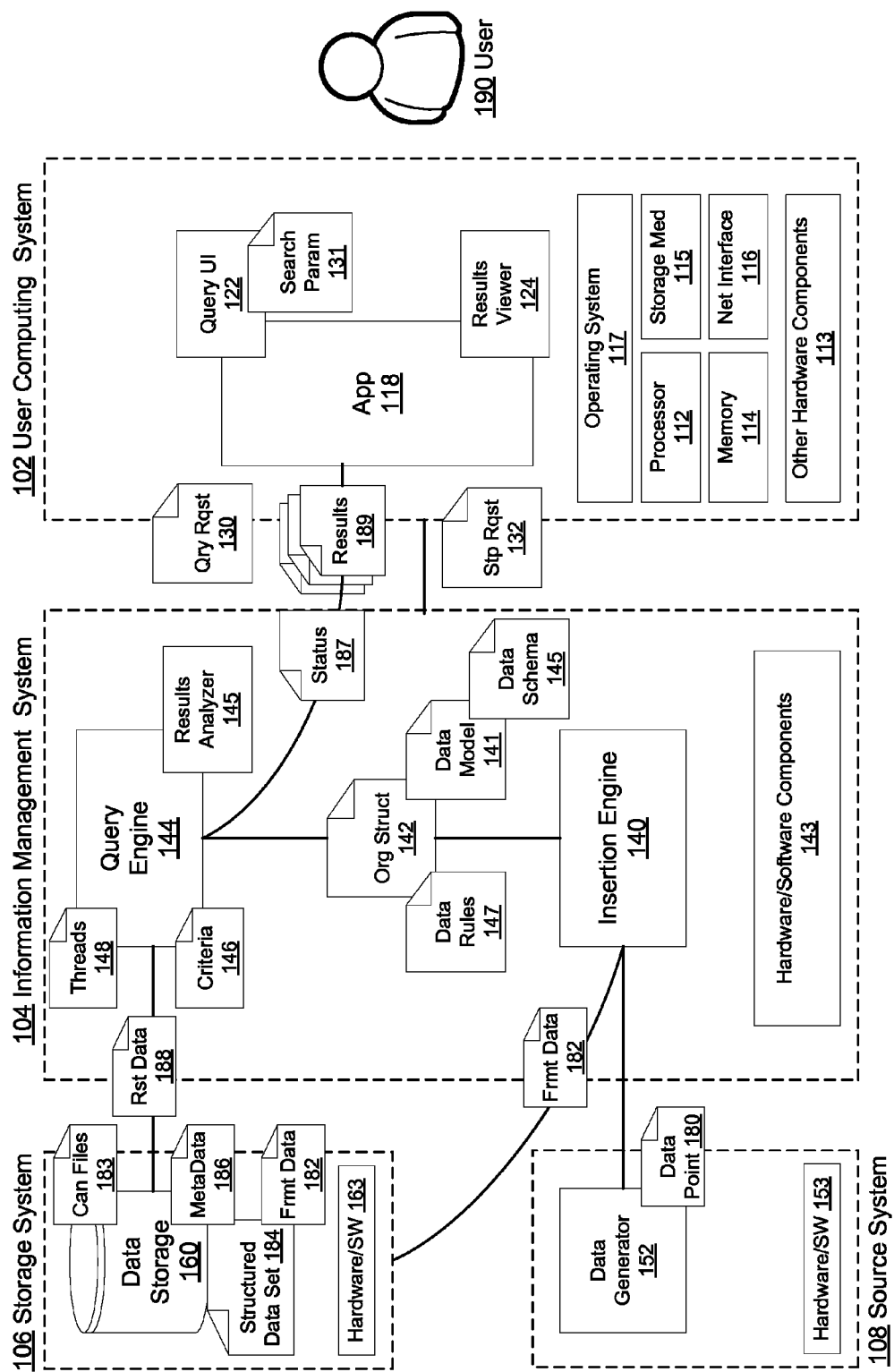
FIG. 1 is a block diagram of an example embodiment of a system in accordance with the disclosed subject matter.

FIG. 1 is a block diagram of an example embodiment of a system 100 in accordance with the disclosed subject matter. In one embodiment, the system 100 may include a user or client computing system or device 102, an information management computing system or device 104, and one or more data storage computing systems or devices 106. In various embodiments, the system 100 may also include one or more source computing systems or devices 108.

In various embodiments, the user device 102 may include a computing device, such as, for example, a laptop, desktop, workstation, personal digital assistant, smartphone, tablet, and other appropriate computers, etc. or a virtual machine or virtual computing device thereof. In various embodiments, the user device 102 may be used by a user 190. In various embodiments, the user device 102 may include a processor 112 configured to execute one or more machine executable instructions or pieces of software, firmware, or a combination thereof. The user device 102 may include, in some embodiments, a memory 114 configured to store one or more pieces of data, either temporarily, permanently, semi-permanently, or a combination thereof. Further, the memory 114 may include volatile memory, non-volatile memory or a combination thereof. In various embodiments, the user device 102 may include a storage medium 115 configured to store data in a semi-permanent or substantially permanent form. In various embodiments, the storage medium 115 may be included by the memory 114.

In various embodiments, the user device 102 may include one or more network interfaces 116 configured to allow the user device 102 to be part of and communicate via a communications network. Examples of a Wi-Fi protocol may include, but are not limited to: Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to: IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

In various embodiments, the user device 102 may include one or more other hardware components 113 (e.g., a display or monitor, a keyboard, a mouse, a camera, a fingerprint reader, a video processor, etc.). It is understood that the above are merely a few illustrative examples to which the disclosed subject matter is not limited.

In various embodiments, the user device 102 may include an operating system (OS) 117 configured to provide one or more services to an application 118 and manage or act as an intermediary between the application 118 and the various hardware components (e.g., the processor 112, a network interface 116, etc.) of the user device 102. In such an embodiment, the user device 102 may include one or more native applications, which may be installed locally (e.g., within the storage medium 115, etc.) and configured to be executed directly by the processor 112 and directly interact with the OS 117. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 112.

In various embodiments, the user 190 or the application 118 may be able to access a data storage, database, data set 160 or a portion thereof. In such an embodiment, the application 118 may be configured to provide or display a query user interface (UI) 112 configured to allow or facilitate the input of various search parameters 131. These search parameters 131 may be included, in one embodiment, reformatted into a query request 130. In various embodiments, this query request 130 may then be transmitted to the information management device 104. In some embodiments, the information management device 104 may search the data set 160, based upon the given search parameters 131.

In response to the query request 130, the information management device 104 may then return or transmit one or more search results 189 to the user device 102, as described below. In various embodiments, the application 118 may include a results viewer 124 configured to receive the results 189 and display at least a portion of the results or data derived therefrom to the user 190. In various embodiments, the results viewer 124 and/or the query UI 122 may be included as part of a web browser plug-in or add-on. In such an embodiment, the application 118 may include a web browser.

In a preferred embodiment, the information management system 104 may include a results analyzer 145. In such an embodiment, the Results Analyzer 145 may be tightly associated with the Query Engine 144. In various embodiments, this may reduce the bandwidth or amount of data transmitted between the information management system 104 and the user device 102.

In one embodiment, the results analyzer 145 may be configured to summarize the resultant data 188 from the query engine 144 inside or as part of the information management system 104 and then send the summarized results 189 to the application 118 for display. In such an embodiment, results analyzer 145 may include a back-end component configured to analyze the resultant data 188 and then generate results data 189 derived from the resultant data 188.

In some embodiments, the actual or un-summarized results 189 may be transmitted to the application 118 for display. In one embodiment, this may occur after a user 190 has requested, via the application 118, to view the un-summarized results 189, for example, after viewing the summarized results 189. In another embodiment, the transmission of the un-summarized results 189 may be the default or initial behavior of the system 100. It is understood that the above are merely a few illustrative examples to which the disclosed subject matter is not limited.

In various embodiments, the results analyzer 145 may be or include a plug-in to the information management system 104. In such an embodiment, the results analyzer 145 may include a piece of software that enhances another component (e.g., the query engine 144, etc.) and may not, in some embodiments, be run independently. In various embodiments, the information management system 100 may include more than one results analyzer 145. In such an embodiment, each results analyzer 145 may be specialized to pre-process the query resultant data 188 into a different form of display data (e.g., Top N lists, topology graphs, etc.).

It is understood that the above is merely one illustrative example to which the disclosed subject matter is not limited. In various embodiments, the query request 130 may be generated automatically, periodically, or via one or more techniques that involve little if any user 190 interaction. Further, in various embodiments, the query request 130 may include multiple sets of search parameters 131. Also, in some embodiments, the returned search result 189 may indicate that no portions of the data set 160 matched the search parameters 131 of the query request 130.

In some embodiments, the information management system 104 may be configured to transmit occasional query status reports 187 to the application 118. In such an embodiment, the query status message 187 may indicate the progress (e.g., percentile, X of Y operations completed, etc.) state of the query in one or more stages, and/or an aggregated overall progress or estimation of progress of the query indicated by the get progress message. In various embodiments, this may occur via web sockets and/or a HyperText Markup Language (HTML) version 5 mechanism or tag, although, it is understood that the above are merely a few illustrative examples to which the disclosed subject matter is not limited.

However, in a preferred embodiment, the application 118 may periodically or occasionally poll the query engine 144 for the status, as described below in reference to FIG. 2 In such an embodiment, the query engine 144 may receive a get status request or message, and reply with a status update 187. It is understood that the above are merely a few illustrative examples to which the disclosed subject matter is not limited.

As described below, in various embodiments, the information management system 104 may respond to the query request 130 with a query identifier (ID). In some embodiments, the results 189, the query status report 187, and/or additional communications regarding the query between the information management system 104 and user device 102 may include the query identifier (ID).

A more detailed explanation of the process of generating or providing the search results 189 and the storage system that facilitates such results 189 is given below.

In various embodiments, the system 100 may include one or more data sources or generation devices 108, as described above. In various embodiments, the source storage device 108 may include a computing device, such as, for example, a desktop, workstation, blade server, and other appropriate computers, etc. or a virtual machine or virtual computing device thereof. In various embodiments, the data storage device 108 may include one or more hardware and/or software components 153 analogous to those described above in relation to user computing device 102.

In such an embodiment, the source device 108 may include a data generator 152. In some embodiments, the data generator 152 may include a web site or web traffic manager that records Hypertext Transfer Protocol (HTTP) requests and the results thereof. In another embodiment, the data generator 152 may include enterprise management software that records, for example, information or data regarding user sessions related to another service (not illustrated; e.g., customer relationship management software, an enterprise resource planning application, etc.). In yet another embodiment, the data generator 152 may include some other software or sensor that generates data for inclusion into the data storage 160. It is understood that the above are merely a few illustrative examples to which the disclosed subject matter is not limited.

In various embodiments, the data generator 152 may be configured to generate or create a plurality of data points 180. In such an embodiment, these data points 180 may be transmitted to the information management system 104 for insertion into the data storage or database 160. In various embodiments, these data points 180 may be transmitted individually as they are created, transmitted on a periodic basis, or transmitted in a batched fashion.

In various embodiments, the system 100 may include an information management computing system or device 104, as described above. In various embodiments, the information management device 104 may include a computing device, such as, for example, a desktop, workstation, blade server, and other appropriate computers, etc. or a virtual machine or virtual computing device thereof. In various embodiments, the information management device 104 may include one or more hardware and/or software components 143 analogous to those described above in relation to user computing device 102.

In various embodiments, the information management device 104 may include an insertion engine 140 and/or a query engine 144. In some embodiments, the insertion engine 140 and a query engine 144 may be integrated into a single device 104, as illustrated. In another embodiment, the insertion engine 140 and a query engine 144 may be separated and included by separate devices (not illustrated). In yet another embodiment, the insertion engine 140 may be included by the data storage device 106. In one more embodiment, the insertion engine 140 may be included by the source system 108. It is understood that the above are merely a few illustrative examples to which the disclosed subject matter is not limited.

In various embodiments, the insertion engine 140 may be configured to insert, add, edit, or write data to the data storage 160. In such an embodiment, the insertion engine 140 may be configured to format the received data point 180 into the formatted data 182 and then insert that formatted data 182 into the structured data set 184.

In various embodiments, the insertion engine 140 may be configured to organize the data in a manner suited to the specific data set or nature of the data. In such an embodiment, each structured data set 184 may be associated with a respective organizational structure 142. In various embodiments, this organizational structure 142 may define the hierarchy used in the structured data set 184, a directory structure or organization (e.g., how files are grouped together, etc.), the file formats, file/directory names formats, file contents, etc. In some embodiments, the organizational structure 142 may define one or more constraints or rules 147 used in managing the structured data set 184 (e.g., a time limitation before files or formatted data 182 are purged or deleted, a maximum file size, etc.). It is understood that the above are merely a few illustrative examples to which the disclosed subject matter is not limited. In various embodiments, the organization structure 142 may be configured to reduce file congestion or contention. In one embodiment, the organizational structure 142 may be created or selected by a user 190 or an administrator (not shown).

In various embodiments, the insertion engine 140 may be configured with filtering rules that reduce the data being persisted by eliminating unwanted data (e.g., field-specific data rules, record-specific data rules, etc.). In such an embodiment, this may be used to enforce security policies, privacy policies, reduce bandwidth to the storage system 106, reduce the overall size of the storage system 106 while preserving the overall time-based retention, etc. It is understood that the above are merely a few illustrative examples to which the disclosed subject matter is not limited.

For example, in one embodiment, data concerning atomic data (e.g., web traffic, etc.) may be stored chronologically in multiple files that are limited in size and timeframe. In such an embodiment, these files may be stored in directory hierarchies that reflect timeframes (e.g., directory-by-year containing directory-by-month containing directory-by-day, etc.) In such an embodiment, only the most recent files in the most recent directory are open for writing. In such an embodiment, incoming or formatted data 182 may only affect a well-defined file set (e.g., the files in today's directory, etc.) and may leave the rest of the files (e.g., files in older directories, etc.) available for read activity. In some embodiments, the oldest data may be purged by deleting files, as dictated by the data rules 147.

In another embodiment that includes data that is less atomic in nature, such as for example user sessions, the data may be split into two groups: terminated or user-sessions that have ended and on-going or user sessions that are in-progress or have not ended. In such an embodiment, terminated data may be handled as described above (e.g., stored by time, etc.). However, in one embodiment, in-progress data may involve two or more problems or issues. These problems may include, in various embodiments, a lack of well-defined timeframe (since the user session is not completed yet) and frequent updates (as events occur in the user session). Further, in some embodiments, it may be desirable that as soon as a user session is ended, its respective in-progress data be migrated to or be stored amongst the terminated data.

In one embodiment, to address these issues, the organizational structure 142 may dictate that the in-progress data be stored in individual files (e.g., one file per user session identifier or ID, etc.). Such an embodiment may cause the in-progress data to be easier to find (e.g., by user session ID, etc.), easier to update (e.g., by editing or updating the respective in-progress file, etc.), and easier to migrate to a terminated state (e.g., append the in-progress data to the appropriate file of terminated records and then delete the in-progress file, etc.). It is understood that the above are merely a few illustrative examples to which the disclosed subject matter is not limited.

As described above, in various embodiments, the records or formatted data 182 may be thought of as falling into two broad categories, atomic and non-atomic. In such an embodiment, the atomic data may include data records 182 that are complete when written and then never or rarely rewritten. Whereas, in one embodiment, non-atomic data may include data records 182 that are generally not complete by the time they are written to the data storage 160, and thus requiring an initial write, one or more updates, and a final write. In some embodiments, a non-atomic record 182 may also involve a deletion of the initial record in order to move it to the atomic or finalized structure. It is understood that the above is merely one illustrative example to which the disclosed subject matter is not limited.

In various embodiments, the organizational structure 142 and the system 100 may be organized to allow various abilities of the data storage 160. In one embodiment, the system 100 and organizational structure 142 may be configured to store records or formatted data 182 in a remote (e.g., via a network) file system (e.g., data storage 160). In one embodiment, the system 100 and organizational structure 142 may be configured to facilitate or allow self-maintenance or retention management of the data storage 160 (e.g., the insertion engine 140 may be configured to properly add, edit, or delete records or formatted data 182, etc.). In some embodiments, the system 100 and organizational structure 142 may be configured to allow human manipulation of folders content and, in various embodiments, even files to enable manual archiving and restore operations at least of completed records 182.

Figure 2:
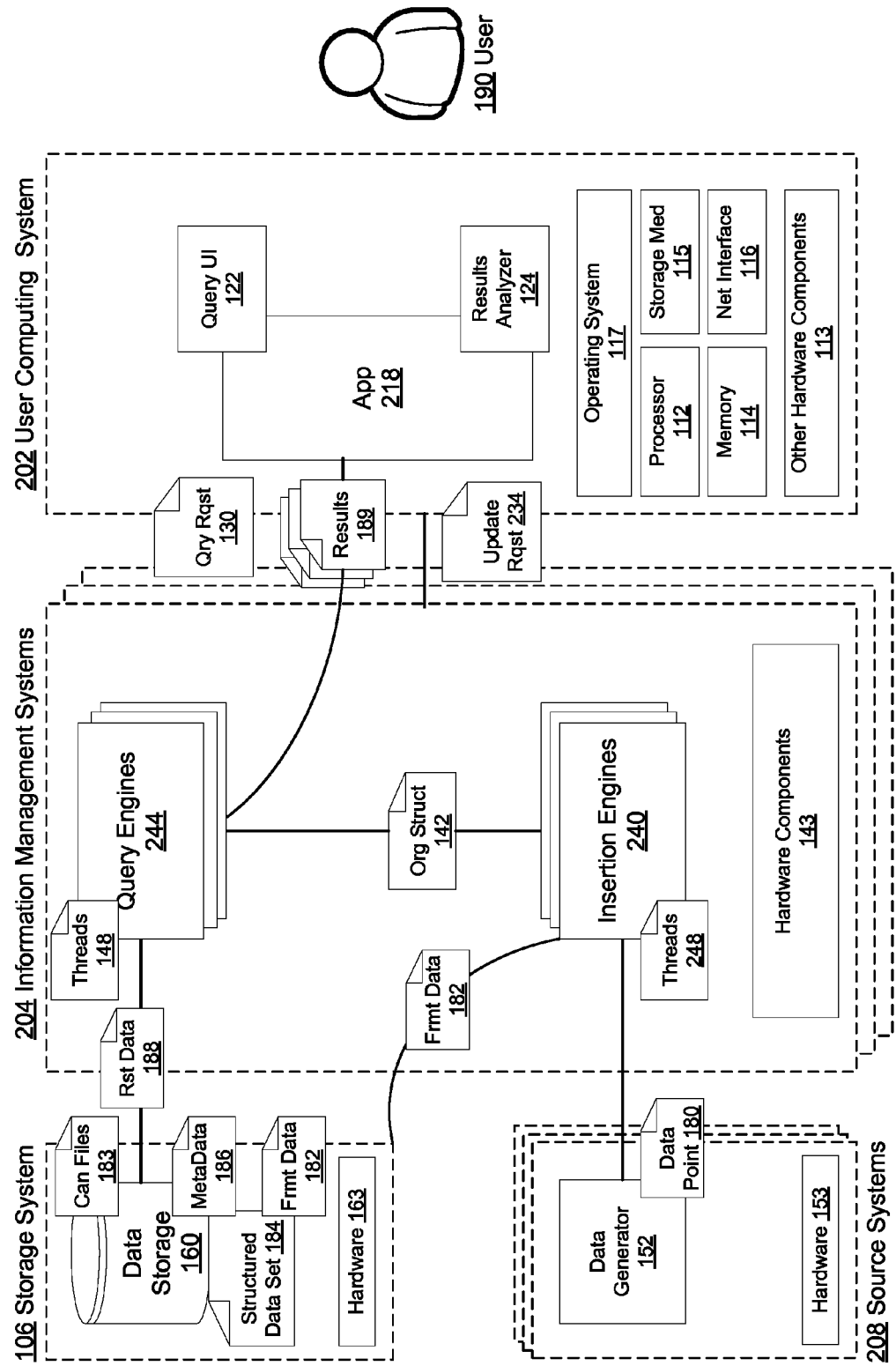
FIG. 2 is a block diagram of an example embodiment of a system in accordance with the disclosed subject matter.

In various embodiments, the system 100 and organizational structure 142 may be configured to allow concurrent, overlapping, or substantially simultaneous writing and reading from a plurality of insertion engines 140 and query engines 144 of a shared data storage 160 (as illustrated in FIG. 2). In one embodiment, the system 100 may be configured such that query engine 144 may read records produced by any of a plurality of insertion engines 140. In such an embodiment, this may occur across network nodes, across suppliers, or even across data schemes. In some embodiments, the query engine 144 and insertion engine 140 may independently perform or operate without the presence of each other, such that the only medium or point of communication may be the data storage 160. It is understood that the above are merely a few illustrative examples to which the disclosed subject matter is not limited.

In some embodiments, the system 100 may include multiple storage systems 106. In such an embodiment, the storage system 106 may be distributed in nature. In various embodiments, the query engine 144 and insertion engine 140 may be local to the respective storage systems 106, remote or a mixture thereof. The user device 102 may not know or care about the relationship between the engines 144 & 140 and the storage system 106. However, similarly to the illustrated embodiment, a single query engine 144 and/or insertion engine 140 may be configured to access or manage, respectively, multiple storage systems 106.

As an example, one could install the engines 140 & 144 on a single server and attach multiple external hard drives 106 in order to achieve petabyte capacity. That may mean that the engines 140 & 144 would be configured with multiple root directory paths. In some embodiments, this may be ideal or desirable for dedicating write and/or read threads to different drives in order to maximize the efficiency of the hardware. It is understood that the above is merely one illustrative example to which the disclosed subject matter is not limited.

In various embodiments, the system 100 and the organizational structure 142 may be configured to avoid opening too many files concurrently or limit the number of active file handles. In some embodiments, the system 100 and the organizational structure 142 may be configured to avoid excessively high rates of open/close operations. In another embodiment, the system 100 and the organizational structure 142 may be configured to reduce contention on the data storage 160's file system. In various embodiments, the system 100 and the organizational structure 142 may be configured to avoid file locks (e.g., caused by accessing a file, etc.). In some embodiments, system 100 and the organizational structure 142 may be configured to avoid relying on the order of writes and reads and to expect proper inter-process signaling through a file's content. It is understood that the above are merely a few illustrative examples to which the disclosed subject matter is not limited.

In some embodiments, the organizational structure 142 may include a data model 141 and a data schema 145. In one embodiment, the data model 141 may represent or list the domain of all record types and fields that may be understood by the Insertion Engine 140. In some embodiments, the data schema 145 may dictate how a single record 182, specifying the fields that comprise the data record 182 are to be formatted and defined. In one embodiment, a data model 141 may be established or defined at a configuration time (or at a build time). Conversely, the data schema 145 may depend upon the fields or data points 180 that are exchanged between the data generator 152 and the insertion engine 140.

In various embodiments, one or more of the organizational structure 142, data model 141, data schema 145, and/or the data rules 147 may be formatted using a text based format (e.g., Extensible Markup Language (XML), JavaScript Object Notation (JSON), etc.) or a binary format In various embodiments, the data model 141 may dictate that a record type comprises one or more of the following attributes: a set of fields, a time-index field, an ID-index field, and a terminal field. In some embodiments, the following rules may apply: the time-index, ID-index and terminal fields may be optional or mandatory and if specified, defined in the set of fields; that at least one time-index or ID-index must be specified per formatted data or record 182; that if both a time-index and an ID-index are specified, then the terminal field is also specified; that the time-index and ID-index, if specified, are a field of a certain variable type (e.g., string, character array, Boolean, long integer, etc.); and the terminal field, if specified, be a Boolean field. It is understood that the above are merely a few illustrative examples to which the disclosed subject matter is not limited.

In various embodiments, the data model 141 may dictate that a field of a record comprises at least one of the following attributes: an export-name or internal name of the field that is used by the insertion engine and the data generator, a grammar-name or external name that is used by the query engine, a data type that defines the values the field may assume (e.g., integer, Boolean, String, maps, lists, arrays, etc.), and an indication as to whether or not the field is mandatory for the respective record. However, in a preferred embodiment, the system 100 may have a single naming scheme (versus a multiple naming scheme, such as, export & query names). It is understood that the above are merely a few illustrative examples to which the disclosed subject matter is not limited.

In various embodiments, the system 100 may be configured to handle more than one data model 141 or organizational structures 142 simultaneously. In such an embodiment, queries may be submitted against any data model 141 at any time. In various embodiments, the query request 130 may identify which data model 141 it is targeting. In some embodiments, the different data models 141 may be linked. In such an embodiment, in order to satisfy a query, the query engine 144 may require each model 141 to specify each field that contains an ID for another model 141. In other words, each model 141 may be configured to know which other models 141 it may link to, even if those other models 141 have no idea that this link exists. This may allow new models 141 to be added in the future that link to or build onto existing models 141 without having to alter any of those existing models 141.

In the illustrated embodiment, the insertion engine 140 may be configured to receive the raw data point 180. In various embodiments, the insertion engine 140 may download or pull the data points 180 from the data generator 152, the data generator 152 may upload or push the data points 180 from the insertion engine 140, or a combination thereof.

In various embodiments, the insertion engine 140 may reformat the raw data point 180 (if needed) based upon the data model 141 and the data schema 145. This now formatted data 182 may then be inserted into the data storage 160. In the illustrated embodiment, this may be done in accordance with the organizational structure 142. For example, atomic formatted data 182 may be placed into a file with a filename based on the time of the data and in a directory based on the time of the data, as described above. It is understood that the above is merely one illustrative example to which the disclosed subject matter is not limited.

In some embodiments, this insertion may include a number of operations. For example, in the case of non-atomic data, the file associated with the formatted data 182 may be edited with the new formatted data 182. If the new formatted data 182 closes the record or ends the session associated with the non-atomic data, the entire file may be read by the insertion engine 140, the data or record from the file may be re-formatted into an atomic or archived structure, that new formatted data 182 may be inserted into the atomic or archived portion of the structured data set 184, and then the old non-atomic file may be deleted form the data storage 160. In some embodiments, one or more of those operations may be performed by the storage system 106 at the request of the insertion engine 140. For example, an "update-and-archive" command may accompany or be included in the formatted data 182 transmitted as a result of the final data point 180. It is understood that the above are merely a few illustrative examples to which the disclosed subject matter is not limited.

In various embodiments, a user 190 or administrator or other entity (e.g., data generator 152) may be able to issue commands to the insertion engine 104. For example, one may be able to command the insertion engine 140 to start or stop processing data points 182, to connect to a data storage system 106 or a structured data set 184 (e.g., if a storage system 106 includes multiple structured data sets 184, etc.), to add or remove a data generator 152 from a list of data generators 152 the insertion engine 140 is in communication with, to limit or not receipt of data points 180 from a list of allowed data generators 152, etc. In some embodiments, the insertion engine 104 may be configured to process each data insertion as a single execution thread, process, or sequence of programmed instructions that may be managed independently by an operating system scheduler. In such an embodiment, the insertion engine 140 may be configured to utilize a certain or maximum number of threads or processes, and may be configured to have this value altered via a command, as described above. It is understood that the above are merely a few illustrative examples to which the disclosed subject matter is not limited.

In various embodiments, the system 100 may include one or more data storage devices 106, as described above. In various embodiments, the data storage device 106 may include a computing device, such as, for example, a desktop, workstation, blade server, and other appropriate computers, etc. or a virtual machine or virtual computing device thereof. In various embodiments, the data storage device 106 may include one or more hardware and/or software components 163 analogous to those described above in relation to user computing device 102.

As described above, in various embodiments, the data storage device 106 may include a database, data storage, or data set 160. In such an embodiment, the data set 160 may be structured such that the data is stored in a predefined way or format. This data is illustrated as structured data set 184. This structured data set 184 may include a plurality of formatted data or records 182. In the illustrated embodiment, these formatted data or records 182 may have originally been generated or produced by a source system or device 108, as described above.

As described above, in one embodiment, the user 190 or application 118 may submit one or more query requests 130 to a query engine 144. In the illustrated embodiment, the query engine 144 may be configured to, in response to the query request 130, crawl or search through the structured data set 184 looking for matches or hits as defined by the search parameters 131. In various embodiments, the formatted data 182 that meet the search parameters 131 or different criteria 146, as defined by the embodiment, may be referred to and transmitted to the information management system as resultant data 188.

In various embodiments, once the query engine 144 receives the resultant data 188, it may stream one or more of the results 189 to the application 118. In such an embodiment, these streamed results 189 or results 189 that are provided to the application 118 before the query has fully completed may be referred to as partial results 189. In some embodiments, this streams of results 189 may continue as additional pieces of result data 188 are received or periodically, until either the search is finished or the query engine 144 receives a stop request 132 from the application 118. This is contrasted against traditional search systems in which the results 189 are generally only transmitted to the application 118 once all of the search results 189 have been obtained, or which maintain rigid schemas and limited indexing in order to stream results.

In the illustrated embodiment, by using an organizational structure 142 that includes a multi-file-based structure the query engine 144 may be able to search individual files quickly and with a minimum or reduced amount of file access or locks (compared to the monolithic database solution). In such an embodiment, each record or formatted data 182 may comprise a single file. In another embodiment, a relatively small set of formatted data 182 (compared to the structured data set 184) may be included in a single file. In such an embodiment, the query engine 144 may be able to access, read, or search files or formatted data 182 without blocking or causing a file contention issue with the insertion engine 140. As described above, in some embodiments, the organizational structure 142 and the nature of the data (e.g., atomic, etc.) may allow the insertion engine 140 to write to files that are not being searched by the query engine 144. It is understood that the above are merely a few illustrative examples to which the disclosed subject matter is not limited.

In various embodiments, the streaming of results 189 before the entire search process has completed and the use of the organizational structure 142 (e.g., a multi-file architecture, etc.) may allow the information management system 104 to be faster and more responsive than traditional data storage systems as not all records or data 182 need to be searched before results are returned. As described above, in various embodiments involving "Big Data" these data sets may be quite large (e.g., >1 PB, millions of records or more, etc.) which cause the search procedure to take a substantial or undesirable (e.g., >30 seconds, >5 minutes etc.) amount of time. Further, in some embodiments, the use of a structured data set 184 may allow the information management system 104 to be searched at the same time data set 184 is being modified. In yet another embodiment, the use of a structured data set 184 (e.g., multiple small files, etc.) may reduce the amount of temporary or work storage space required, as the query engine 144 may avoid the copy/delete operations required by systems that have trouble ensuring read consistency. It is understood that the above are merely a few illustrative examples of advantages to which the disclosed subject matter is not limited.

In the illustrated embodiment, the query engine 144 may be configured to select or limit the search to a sub-set of candidate files 183 within the structured data set 184 based upon one of the organizing principles of the data storage 160, as defined by the organizational structure 142. For example, in the case of web traffic (or some instances of atomic data), this organizing principle may be based on time, as described above. In such an embodiment, having selected one or more candidate files 183 for processing, the query engine 144 may be configured to then spawn, launch, or create multiple threads 148. In various embodiments, these threads 148 may be configured to parse the candidate files 183 and look for the relevant data, as defined by the search parameters 131. In various embodiments, instead of candidate files 183, candidate records or formatted data 182 may be selected, or groups of formatted data 182 if they are not organized or grouped by files. It is understood that the above are merely a few illustrative examples to which the disclosed subject matter is not limited.

In various embodiments, the query engine 144 may manage the search via a plurality of stages. In one embodiment, the query engine may include a first stage or phase described as a "discovery phase". As described above, in the discovery phase the query engine 144 may be configured to find files 183, records, or formatted data 182 that will need to be scanned for the search. In some embodiments, an important identifying field or time range may be indicated in the search parameters 131. In such an embodiment, the discovery phase may only select files, or records that match the defined range. It is understood that the above is merely one illustrative example to which the disclosed subject matter is not limited. In various embodiments, the discovery phase may make use of a strategy or technique designed to find a candidate file 183 as quickly as possible (e.g., examine most recent files first, examine files related to a certain geography or business sector first, etc.). In some embodiments, the search may finish with only the discovery process being executed if no candidate files 183 or records are found.

In one embodiment, a phase or stage of the search may include scanning or parsing the candidate files 183. In such an embodiment, the contents of each candidate file 183 and its respective included formatted data or records 182 may be parsed or examined for the information described in the search parameters 131, as described above.

In various embodiments, a third phase or stage may include completing or returning the results. In such an embodiment, as files 183 finish being processed or scanned and, if those candidate files include formatted data 182 that matches the search parameters 131, those files 183 or formatted data 182 may be provided to the query engine 144 as resultant data 188. These resultant data 188 may then be streamed (e.g., pushed, pulled, periodically streamed, etc.) to the application 118 as results 189.

In various embodiments, these three stages may be pipelined and not atomic. In such an embodiment, the processing stage may start as soon as the discovery phase finds one candidate file 183 or formatted data 182. Likewise, in one embodiment, the completion or returning stage may start as soon one piece of resultant data 188 is found. In various embodiments, other threshold values for progressing to the next stage may be used and may be different for each stage.

In various embodiments, each of these stages may launch or execute a plurality of threads to perform the stage (or portions thereof) substantially in parallel on multiple candidate files 183 or formatted data records 182. In such an embodiment, the number of threads used may be predefined using the query engine criteria 146. In another embodiment, the number of threads used may be dynamically determined using one or more rules defined in the query engine criteria 146 (e.g., processor load, time to complete a stage, importance or category of the query request 130 or user 190, etc.). It is understood that the above are merely a few illustrative examples to which the disclosed subject matter is not limited.

In various embodiments, the query engine 144 may be configured to provide the application 118 with progress reports (illustrated as part of results 189) as to the state of the query or search. In such an embodiment, the application 118 or results viewer 124 may be configured to display a progress indicator (e.g., icon, progress bar, text value, etc.) to the user 190. In some embodiments, the query engine 144 or application 118 may be configured to use progress reports or indicators that display the state of each stage separately (e.g., 400 candidate files out of 10,000 files searched, 10,000 files out of 452,987 total files, 176 of 400 candidate files scanned, etc.) or an aggregated progress metric (e.g., using a weighted average amongst the stages, etc.). It is understood that the above are merely a few illustrative examples to which the disclosed subject matter is not limited.

In one embodiment, the parsing of candidate files 183 or the selected formatted data 182 may be optimized or improved using one or more metadata files 186 associated with each data file or group of formatted data 182. Each metadata file 183 may include a unique list of the values contained in a specified field within the associated data file 183 or otherwise grouped formatted data 182. In various embodiments, multiple metadata files 183 may be associated with each file 183. In yet another embodiment, the metadata file 183 may include a plurality of lists, wherein each list includes the values contained in a respective specified field within the associated data file 183.

In one example embodiment, a file 183 may include a number of formatted data records 182 that represent web page records or records of web page hits or accesses. In such an embodiment, the file 183 may be associated with or accompanied by a first metadata file 183 that lists the page identifiers (IDs) included within the associated data file 183. A second metadata file (also illustrated by metadata files 186) associated with the same data file 183 may include the number of pages that exhibited availability problems (e.g., page not found errors, broken connections, etc.). It is understood that the above is merely one illustrative example to which the disclosed subject matter is not limited.

In another example embodiment, a metadata file 186 may include a description of the contents of the associated file 183 (e.g., a definition of a code used in the file's 183 name, one or more values describing a customer, server, and/or time period covered by the associated file 183 etc.). The metadata file 186 may include, in one embodiment, a file length of the associated file 183. In various embodiments, the metadata file 186 may include an index of one or more of the contents of the associated file 183. In some embodiments, the metadata file 186 may include a list of logical offsets to individual formatted data or records 182 included by the file 183. In one embodiment, the metadata file 186 may include a lookup table to aid in file compression or decoding. It is understood that the above are merely a few illustrative examples to which the disclosed subject matter is not limited.

In various embodiments, the metadata files 186 may be read extremely quickly and may allow the query engine 144 to rapidly determine whether a given data file 183 is worth parsing. In some embodiments, the metadata files 186 may be small enough to be cached in memory or copied and cached in the information management system 104. In some embodiments, the metadata files 186 or even the files 183 may be stored in various formats (e.g., binary, comma-separated values (CSV, XML, JSON, etc.). It is understood that the above are merely a few illustrative examples to which the disclosed subject matter is not limited.

As described below and illustrated by FIG. 2, in various embodiments, the query engine 144 may be configured to support a number of operations or commands. In the illustrated embodiment, the query engine 144 may be configured to support the query request 130 that includes a set of search parameters 131 and begins the query or search process. In various embodiments, the query engine 144 may be configured to immediately or quickly return an acknowledgement to the query request 130, a query identifier, and/or a query failure message if the query engine 144 is not able to fulfill the query request (e.g., unable to connect to the data storage 160, misconfiguration, an error in the query request 130, etc.).

In the illustrated embodiment, the query engine 144 may be configured to support a stop or cancel query request or message 132. In such an embodiment, the stop query request 132 may include a query ID and cause the query engine 144 to stop or abort the query or search associated with that ID. In one embodiment, the query engine 144 may return as results 189 any processed but untransmitted resultant data 186 and status. In another embodiment, the query engine 144 may return an acknowledgement to the stop request 132. In some embodiments, the stop query request 132 or variants thereof may also include instructions to pause or resume the query.

In other embodiments, the query engine 144 may be configured to support one or more of the following: a get progress message, a get state message, a get results message, and a get result stream message. In such an embodiment, the get progress message may cause the query engine 144 to provide the application 118 with the progress (e.g., percentile, X of Y operations completed, etc.) state of the query in one or more stages, and/or an aggregated overall progress or estimation of progress of the query indicated by the get progress message. In one embodiment, the get state message may cause the query engine 144 to provide the application 118 with the state (e.g., "running", stopped", "cancelled", etc.) of the query ID included by the get state message.

In some embodiments, the get results message may cause the query engine 144 to provide the application 118 with any results 189 (associated with the query indicated by the message) that have not been transmitted to the application 118 yet. In such an embodiment, the application 118 may periodically pull or download results 189 from the query engine 144. In another embodiment, the get results message may cause the query engine 144 to provide the application 118 with all results 189 that have been generated by the query, regardless of whether or not they have been previously transmitted.

In yet another embodiment, the get results message may cause the query engine 144 to provide the application 118 with a stream of results 189 on either a periodic basis or as the results are found. In such an embodiment, the query engine 144 may push or upload results 189 to the application 118. In various embodiments, the stream results message may include a variant or counterpart that causes the query engine 144 to stop or delay providing the application 118 with the results 189 or adjusts the timing of the delivery. It is understood that the above are merely a few illustrative examples to which the disclosed subject matter is not limited.

In various embodiments, the system 100 may be configured to support very flexible and responsive queries, no matter the number of files 183 or records 182 being queried or searched. In such an embodiment, the query engine 144 may be configured to report progress nearly immediately and return results 189 very quickly (e.g., in less than one second), even if the overall query or search may take minutes or even hours to complete. In such an embodiment, a user 190 may have near immediate or quick (e.g., less than 1 or 2 seconds, etc.) awareness of whether the query is able to find the data they expected. In various embodiments, this may allow a user 190 to cancel a disappointing search or query much more quickly and adjust the query's criteria (i.e. design a new query). In such an embodiment, the query may be progressively adapted as new results 189 become available.

In various embodiments, the streaming ability of the query engine 144 may allow a user 190 to choose how they wish to work. In one embodiment, the user 190 may interact with the results 189 as they are available or appear on the results viewer 124. In another embodiment, the user 190 may wait for a representative set of results 189 to come back and then kill or stop the rest of the query. In yet another embodiment, the user 190 may wait until the full result set has been returned. It is understood that the above are merely a few illustrative examples to which the disclosed subject matter is not limited.

In various embodiments, the system 100 may be configured to analyze over 10,000 records 182 every second. In some embodiments, the data being returned or results 189 may tend to settle down to or approach a predictable result very quickly (e.g., within less than 3 seconds, etc.) in the majority of cases. In such an embodiment, this may be similar to election results in which winners and losers can be predicted very quickly from the first representative batch of data. In some embodiments, results 189 may be made to be more representative in the early stages by applying different strategies for choosing which files to read (e.g., processing the list of files related to the query in random order, spreading the parsing, reading, or threads thereof equally throughout the timeframe or range of the search, etc.). It is understood that the above are merely a few illustrative examples to which the disclosed subject matter is not limited.

FIG. 2 is a block diagram of an example embodiment of a system 200 in accordance with the disclosed subject matter. In one embodiment, the system 200 may include a user or client computing system or device 202, a plurality of information management computing systems or devices 204, and one or more data storage computing systems or devices 106. In various embodiments, the system 200 may also include a plurality of source computing systems or devices 208.

In the illustrated embodiment, the system 200 may include a plurality of source computing systems or devices 208, each providing their respective data points 180. In one embodiment, this plurality of source computing systems or devices 208 may all feed into or communicate with a single insertion engine (e.g., insertion engine 140 of FIG. 1). However, in the illustrated embodiment, the system 200 includes plurality of information management computing systems or devices 204 and includes a plurality of insertion engines 240. In various embodiments, a single information management computing system may include a plurality of insertion engines 204. In such an embodiment, the each source system 208 may be associated with a respective information management system 204 or a respective insertion engine 240. In another embodiment, source systems 208 may provide data points to the information management system 204 as an aggregated pool. In another embodiment, a combination of variation of such schemes may be used or employed. In various embodiments, each insertion engine 240 may make use of a plurality of write or insertions threads 248 to process a plurality of substantially simultaneous insertion operations (e.g., similarly to the query threads 148, etc.). It is understood that the above are merely a few illustrative examples to which the disclosed subject matter is not limited.

Likewise, in various embodiments, the information management systems 204 may include one or more query engines 244. In such an embodiment, the plurality of query engines 244 may be configured to process substantially simultaneously a plurality of query requests 130 from a number of user computing system 202 (only one illustrated). In one less preferred embodiment, the query engines 244 may be configured to process a single query request 130 in parallel similarly to the simultaneous use of threads 148, as described above. It is understood that the above are merely a few illustrative examples to which the disclosed subject matter is not limited.

In some embodiments, the user device 202 may be configured to transmit one or more update request messages 234. As described above, these update requests 234 may include one or more commands to the respective query engine and may also include a query identifier (ID) to indicate the query to which the command pertains. In some embodiments, these commands may include one of the following: a get progress command, a get state command, a get results command, a get results stream command, and/or a cancel query command, as described above. It is understood that the above are merely a few illustrative examples to which the disclosed subject matter is not limited.

Figure 3:
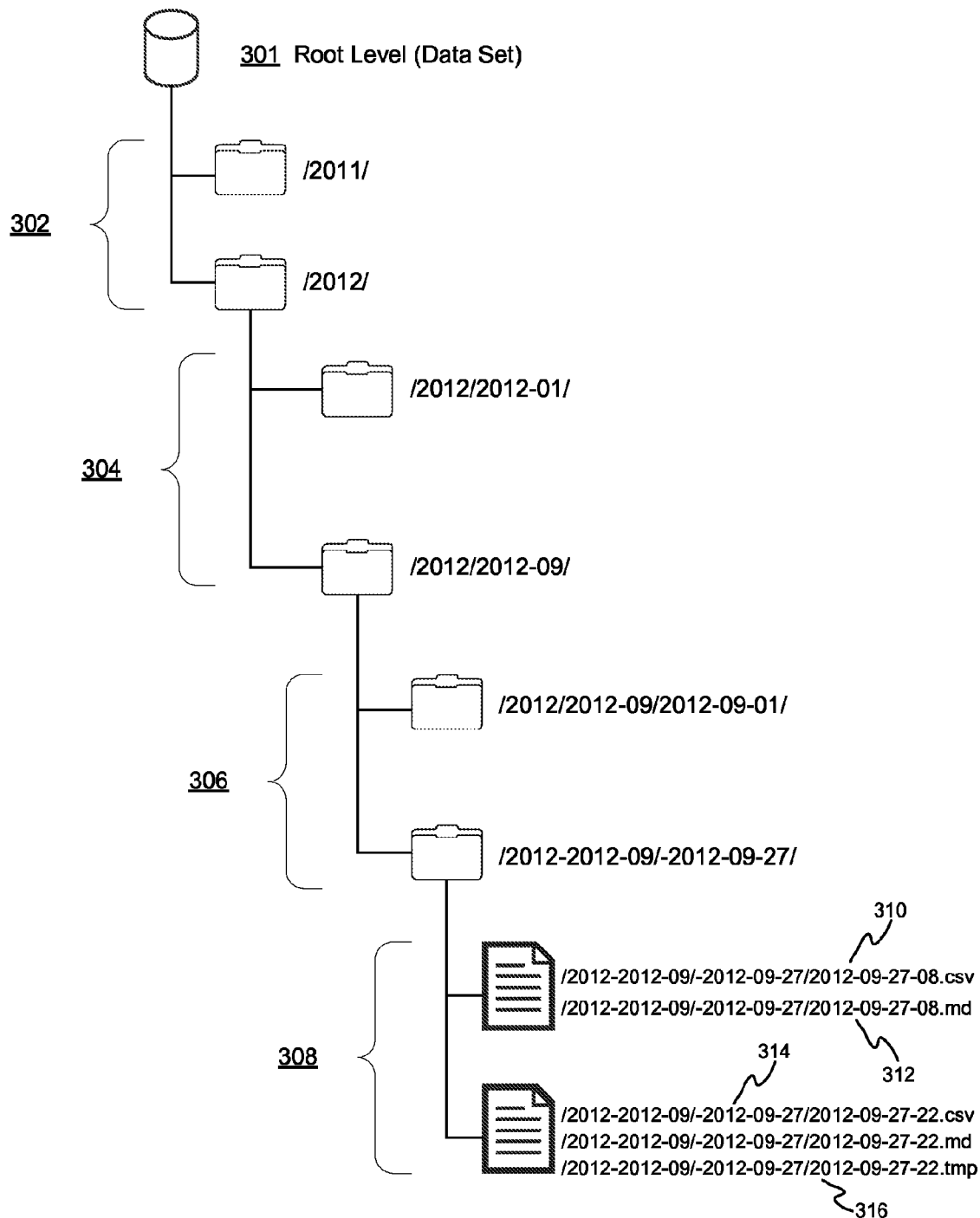
FIG. 3 is a block diagram of an example embodiment of a data set structure in accordance with the disclosed subject matter.

FIG. 3 is a block diagram of an example embodiment of a data set structure 300 in accordance with the disclosed subject matter. In the illustrated embodiment, an organizational structure 300 for data that is substantially atomic in nature is shown. In the illustrated embodiment, the data stored may be organized primary by time. It is understood that the above is merely one illustrative example to which the disclosed subject matter is not limited.

In one embodiment, the organizational structure 300 may include a top or root level 301 from which or under which the data is organized. In the illustrated embodiment, the organizational structure 300 may include a second hierarchical tier 302 that is organized by year or some other broadly defined grouping (e.g., geographical region, continent, business division, company, etc.). In the illustrated embodiment, the organizational structure 300 may include a third hierarchical tier 304 that is organized by month or some other more narrowly defined grouping (e.g., country, business unit, etc.). In the illustrated embodiment, the organizational structure 300 may include a fourth hierarchical tier 306 that is organized by day or some other even more narrowly defined grouping (e.g., state, territory, or province; manager's group; etc.). In the illustrated embodiment, the organizational structure 300 may include a fourth or bottom hierarchical tier 308 that includes all the data points or formatted data that occurred on that day or some other atomic event or data item (e.g., sales within the given state, territory, or province; employee or individual contributor, etc.). It is understood that the above is merely one illustrative example to which the disclosed subject matter is not limited.

In various embodiments, the hierarchy may include many more depths or tiers (e.g., to the seconds, to the minutes, to five minutes, etc.). In various embodiments, the hierarchy may be based upon a desired balance between a reasonable number of files and a granularity of data. For example, limitations of the operating system may limit the number of files allowed within a single directory. In some embodiments, constant or frequent opening and closing of files may be expensive in terms of system resources. As such, the system may be configured to keep files open so long as they are still being written, and closed if it appears that there is nothing left to write. In various embodiments, the system may be configured to pay attention to the activity level of each file or the files in general. It is also understood that the above are merely one illustrative example to which the disclosed subject matter is not limited to hierarchical models or models based-upon time.

In one embodiment, when a set of formatted data or a record is committed or inserted into the data set the atomic data may be assigned a filename as dictated by the organization structure 300 or a set of rules that cause the organization structure 300 to be created. In the illustrated embodiment, the atomic data may be inserted as a file 310 with a filename that indicates the hour in which the data was created. In various embodiments, a metadata file 312 may also be created when the file 310 is added to the data set. It is understood that the above is merely one illustrative example to which the disclosed subject matter is not limited.

In some embodiments, the file 310 may include a plurality of records or pieces of data. In such an embodiment, as the respective file 314 is being edited (to insert the new record or piece of data) a temporary file 316 may be created. Once the insertion is complete the temporary file 316 may replace or be copied over the file 314. It is understood that the above is merely one illustrative example to which the disclosed subject matter is not limited.

In various embodiments, the file 310 may include a text-based file such as a CSV or JSON file, as described above. In a less preferred embodiment, the file 310 may be formatted as an XML file, however, XML format may result in undesirable overhead because of repetitive tags. In a more preferred embodiment, a more highly compact file format may be employed. It is understood that the shown extensions of files 310, 312, 314, and 316 are merely a few illustrative examples to which the disclosed subject matter is not limited.

Figure 4:
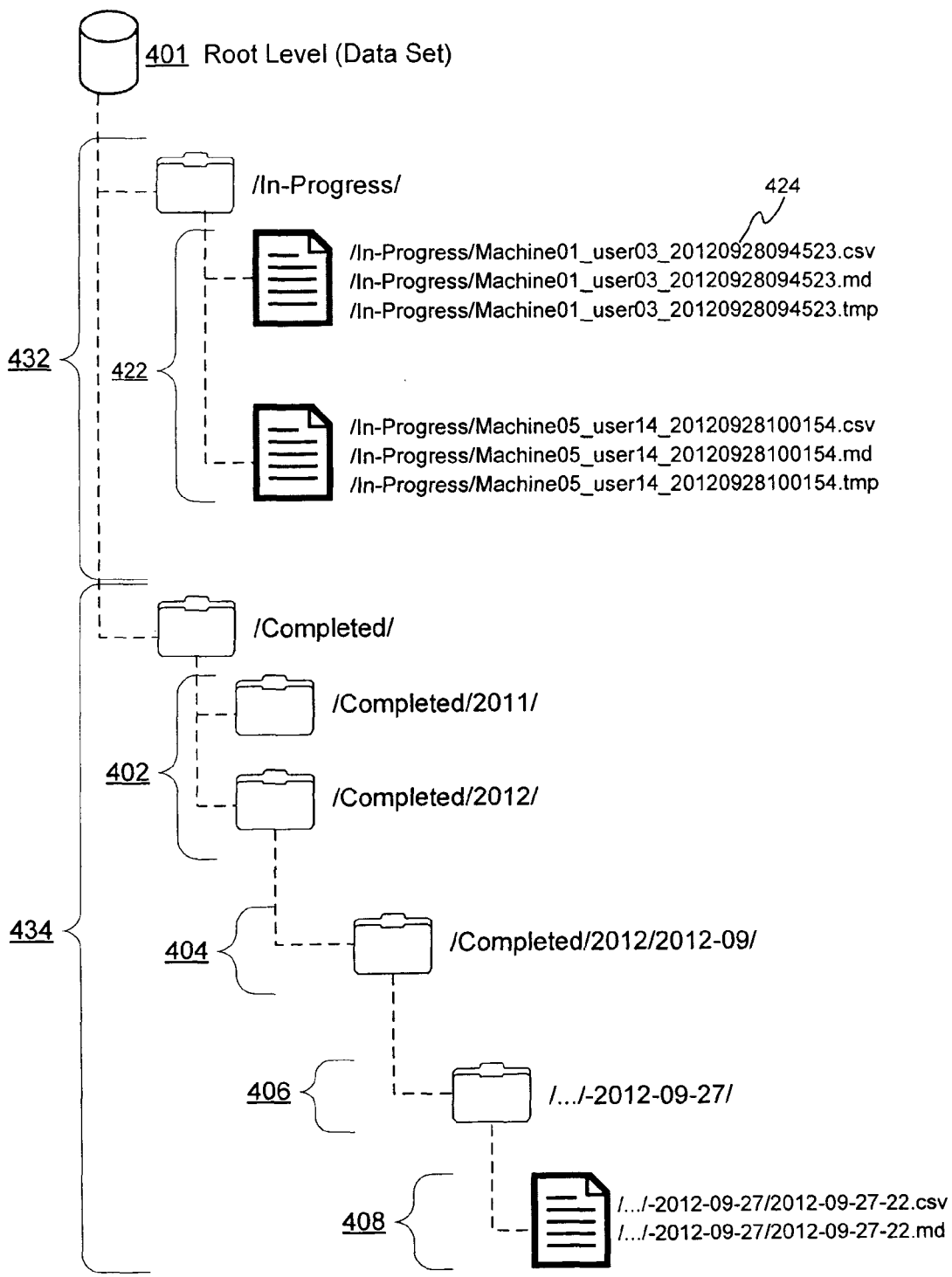
FIG. 4 is a block diagram of an example embodiment of a data set structure in accordance with the disclosed subject matter.

FIG. 4 is a block diagram of an example embodiment of a data set structure 400 in accordance with the disclosed subject matter. In the illustrated embodiment, an organizational structure 400 for data that is substantially non-atomic in nature is shown. In the illustrated embodiment, the data stored may be organized secondarily by time. It is understood that the above is merely one illustrative example to which the disclosed subject matter is not limited.

In one embodiment, the organizational structure 400 may include a top or root level 401 from which or under which the data is organized. In the illustrated embodiment, the organizational structure 400 may include a bifurcated or divided structure that divides the data into in-progress data 432 and completed data 434. It is understood that the above is merely one illustrative example to which the disclosed subject matter is not limited.

In various embodiments, the organizational structure 400 may dictate that each record or non-atomic data comprise one file 424. In such an embodiment, as new data associated with the file (e.g., a user session, etc.) is inserted, the file 424 may be updated or edited, as described above. In some embodiments, the update period may be increased to reduce the number of times a file alteration is expected to occur. Further, in various embodiments, the previously written contents or data included by the file 424 may be immutable and only additional data may be added to the file 424.

In some embodiments, the organizational structure 400 may dictate a naming or filename convention to be used for the file 424. In one embodiment, the filename may include a hash, or predefined encoding scheme. In the illustrated embodiment, the file 424's name includes the machine or computing device used by the user, the user's username or identifier, and the time in which the user session started. It is understood that the above is merely one illustrative example to which the disclosed subject matter is not limited.

In various embodiments, the system (e.g., system 100 of FIG. 1, etc.) may be configured to avoid having two threads trying to write to the same file (e.g., file 424). In such an embodiment, the system may ensure that each thread can "own" the file it is writing by forcing each thread to name its files in a globally unique way. In such an embodiment, the system may avoid any use of file locking, which is generally a performance drain and may potentially cause deadlocks leading to system failure or less critical disadvantages. Further, this may allow off-the-shelf systems, such as storage area networks (SANs), to maximize their performance-boosting features. It is understood that the above is merely one illustrative example to which the disclosed subject matter is not limited.

As described above, in various embodiments, once a user session or other non-atomic data has completed or reached a termination point or event, the file 424 may be copied or moved to the completed portion 434 of the organizational structure 400. Similarly to the organizational structure of FIG. 3, the organizational structure 400 may include a series of hierarchical tiers 402, 404, 406, and 408. In the illustrated embodiment, these tiers or directories 402, 404, 406, and 408 may be organized by time (e.g., year, month, day, etc.).

In various embodiments, as the file 424 is moved from the in-progress region 432 to the completed region 434 the file 424 may be renamed or reformatted. In some embodiments, the file 424 may even be compressed. It is understood that the above are merely a few illustrative examples to which the disclosed subject matter is not limited.

In some embodiments, the system or data set structure may be configured to support multi-tenant environments. In various embodiments, multi-tenancy may be an architectural principle, wherein a single instance of a software program runs or executes on a software-as-a-service (SAAS) vendor's servers, serving multiple client organizations or tenants. In one embodiment of the multi-tenant architectural concept, a software application may be designed to virtually partition its data and/or configuration so that each tenant works with a customized virtual application instance. Each tenant has a virtual "view" of the data and/or processes related to that tenant. Multi-tenant architecture is designed, in various embodiments, to allow tenant-specific configurations of the user interface (UI) (e.g., branding, etc.), business processes and data models. In some embodiments, such customization and partitioning may be enabled without changing the service software. In such an embodiment, the same service software may be shared by all tenants; therefore, transforming system customization into system configuration.

In such an embodiment, a tenant-specific root directory may be added to the data structures 300 and 400 of FIGS. 3 & 4, respectively. In one embodiment, the data generator may be configured to indicate which tenant owns each piece of data (e.g., by tenant-dedicated generators, by inserting a tenant ID field into the data itself, etc.). In another embodiment, a query request may provide a matching tenant ID for which the query is to pertain. In such an embodiment, this may simply be the tenant ID associated with the user that submits the query. In another embodiment, the tenant ID may be manually specified. In yet another embodiment, queries may pertain to multiple or even all tenants. In such an embodiment, this ability may be limited to the access permissions associated with the initiating user. Multi-tenancy could also be enforced by dedicating one or more insertion engines, query engines and/or storage systems per tenant. In such an embodiment, the system may be configured to provide maximum separation of the tenant data.

FIG. 5 is a flow chart of an example embodiment of a technique 500 in accordance with the disclosed subject matter. In various embodiments, the technique 500 may be used or produced by the systems such as those of FIG. 1 or 2. Furthermore, portions of technique 500 may be used with or produce data structures such as those of FIG. 3 or 4. Although, it is understood that the above are merely a few illustrative examples to which the disclosed subject matter is not limited. It is understood that the disclosed subject matter is not limited to the ordering of or number of actions illustrated by technique 500.

Block 502 illustrates that, in one embodiment, a record or other data may be received with the expectation that it will be added to a data set comprising a plurality of files, as described above. In various embodiments, the record may include one or more fields or variables, as described above. In some embodiments, a file in which the record is to be stored may be determined based upon the hierarchical organizational structure, as described above. In some embodiments, the system may have also generated or be executing a plurality of insertion processing threads, as described above. In such an embodiment, the received record may be associated with one of the insertion threads, as described above. In various embodiments, one or more of the action(s) illustrated by this Block may be performed by the apparatuses or systems of FIG. 1 or 2, the insertion engine 140 of FIG. 1, the insertion engine 240 of FIG. 2, as described above.

Block 504 illustrates that, in one embodiment, record may be inserted into a selected or determined file, as described above. In various embodiments, the selected file may be selected or determined based upon the hierarchical organizational structure, as described above. In some embodiments, this may be done by the associated insertion thread, as described above. In some embodiments, the record and/or fields may be re-formatted or formatted according to a predefined defined data schema, as described above.

In some embodiments, it may be determined if the record pertains or is to be inserted into atomic data or non-atomic data. In such an embodiment, if the record pertains to non-atomic data, inserting may include copying the selected file to a temporary file, as described above. In various embodiments, inserting may include writing the record to the temporary file, as described above. In one embodiment, inserting may include overwriting the selected file with the temporary file that now includes the record, as described above. In some embodiments, it may be determined if, based a set of predefined criteria, if the selected file is to be made read-only (e.g., is to be moved from an "in-progress" file to a "completed" file, etc.), as described above. In such an embodiment, the selected file may be moved to a read-only portion of the plurality of files as dictated by the hierarchical organizational structure, as described above. In various embodiments, one or more of the action(s) illustrated by this Block may be performed by the apparatuses or systems of FIG. 1 or 2, the insertion engine 140 of FIG. 1, the insertion engine 240 of FIG. 2, as described above.

Block 506 illustrates that, in one embodiment, a data query request may be received from a user device, as described above. In various embodiments, the data query request may include one or more search parameters to be searched for within a plurality of files that are stored according to a hierarchical organizational structure, as described above. In some embodiments, each file may include at least one data record, as described above. In some embodiments, the hierarchical organizational structure may defines that data related to web traffic is stored in a time-based file structure that includes files limited in size and timeframe, as described above. In another embodiment, the hierarchical organizational structure may define that a read-only portion of the plurality of files is stored in a first portion of a file hierarchy, and a readable-and-writable portion of the plurality of files is stored in a second portion of the file hierarchy, as described above.

In yet another embodiment, the hierarchical organizational structure may define that data associated with user sessions is stored by splitting the data into two groups, completed data and in-progress data, as described above. In such an embodiment, completed data may be stored using a time-based file structure that includes completed files limited in size and timeframe, and in-progress data may be stored in individual in-progress files, each in-progress file associated with an identifier, as described above. In various embodiments, one or more of the action(s) illustrated by this Block may be performed by the apparatuses or systems of FIG. 1 or 2, the query engine 144 or information management system 104 of FIG. 1, the query engines 244 or information management system 204 of FIG. 2, as described above.

Block 508 illustrates that, in one embodiment, that the query request may be responded to with a query identifier that identifies the query resulting from the query request, as described above. In various embodiments, one or more of the action(s) illustrated by this Block may be performed by the apparatuses or systems of FIG. 1 or 2, the query engine 144 or information management system 104 of FIG. 1, the query engines 244 or information management system 204 of FIG. 2, as described above.

Block 510 illustrates that, in one embodiment, a plurality of files may be scanned to determine if one or more files match a sub portion of the search parameters, as described above. In such an embodiment, this may result in one or more candidate files, if any files are determined to meet the sub-portion of the search parameters, as described above. In some embodiments, the hierarchical organizational structure may dictate that directory names and file names include an at least particularly time-based naming scheme, as described above. In such an embodiment, scanning may include examining a time-based portion of the directory names and file names to determine if each respective file is a candidate file, as described above.

In some embodiments, the hierarchical organizational structure may define that for each tenant of a multi-tenant computing system, only files associated with the respective tenant are stored within a partitioned portion of the plurality of files, as described above. In such an embodiment, the data query request may include an indication that of one or more indicated tenants whose data is to be searched, as described above. In such an embodiment, scanning a plurality of files may include scanning only the partitioned portions of the plurality of files associated with the indicated tenants, as described above. In various embodiments, one or more of the action(s) illustrated by this Block may be performed by the apparatuses or systems of FIG. 1 or 2, the query engine 144 or information management system 104 of FIG. 1, the query engines 244 or information management system 204 of FIG. 2, as described above.

Block 512 illustrates that, in one embodiment, the candidate files may be parsed to determine which, if any, records included by the respective candidate files meet the search parameters, as described above. In some embodiments, scanning a plurality of files may produce resultant data, as described above. In one embodiment, parsing may include generating a plurality of query processing threads or the plurality of query processing threads may already be created, as described above. In such an embodiment, parsing may include parsing a sub-portion of the candidate files by each of a portion of the plurality of query processing threads, as described above. In such an embodiment, as each query processing thread generates resultant data, providing the resultant data to a result analyzer, as described above.

In some embodiments, parsing the candidate files may include reading at least a portion of a metadata file associated with a respective candidate file, as described above. In various embodiments, the metadata file may include a list of values included in a specified field within the associated candidate file, as described above. In various embodiments, one or more of the action(s) illustrated by this Block may be performed by the apparatuses or systems of FIG. 1 or 2, the query engine 144 or information management system 104 of FIG. 1, the query engines 244 or information management system 204 of FIG. 2, as described above.

Block 514 illustrates that, in one embodiment, query results may be generated from the resultant data, as described above. In some embodiments, the query results may be generated by one or more result analyzers, as described above. In one embodiment, generating query results may include summarizing the resultant data, as currently produced, to generate the query result, as described above. In some embodiments, generating query results may include, as new resultant data is produced, incorporating the new resultant data into the summarized query result, as described above.

In various embodiments, the action of technique 500 may be pipelined, as described above. In such an embodiment, parsing the candidate files may start or begin once one or more candidate files have been discovered but before scanning the plurality of files has completed, as described above. In one embodiment, generating query results may start or begin once at least one resultant data has been produced but before parsing all of the candidate files has completed, as described above. In various embodiments, one or more of the action(s) illustrated by this Block may be performed by the apparatuses or systems of FIG. 1 or 2, the query engine 144 or information management system 104 of FIG. 1, the query engines 244 or information management system 204 of FIG. 2, as described above.

Block 516 illustrates that, in one embodiment, the query results may be streamed as at least one query result becomes available and before the data query request has been fully processed, as described above. In one embodiment, the time between receiving the data query request and streaming at least one query result and/or a query status report may take less than 1 or 2 seconds, although, it is understood that the above is merely one illustrative example to which the disclosed subject matter is not limited. In some embodiments, the plurality of files includes at least one-hundred million data records, although, it is understood that the above is merely one illustrative example to which the disclosed subject matter is not limited. In various embodiments, one or more of the action(s) illustrated by this Block may be performed by the apparatuses or systems of FIG. 1 or 2, the query engine 144 or information management system 104 of FIG. 1, the query engines 244 or information management system 204 of FIG. 2, as described above.

Block 518 illustrates that, in one embodiment, a stop query request that includes the query identifier may be received, as described above. In various embodiments, this may occur at any time after the initial query request is made, as described above. It is understood that the above is merely one illustrative example to which the disclosed subject matter is not limited. In various embodiments, other query update messages or requests may be received or may occur as described above. In various embodiments, one or more of the action(s) illustrated by this Block may be performed by the apparatuses or systems of FIG. 1 or 2, the query engine 144 or information management system 104 of FIG. 1, the query engines 244 or information management system 204 of FIG. 2, as described above.

Block 520 illustrates that, in one embodiment, the query may be terminated before all query results have been streamed to the user device or other device, as described above. In such an embodiment, this may occur as a result of a received query stop request, as described above. In some embodiments, this may include stopping the execution of any query threads. In another embodiment, this may include no providing results or outputs to the next stage or phase of the query process. In yet another embodiment, this may include stopping a currently executing phase or stage before it has completed. In various embodiments, one or more of the action(s) illustrated by this Block may be performed by the apparatuses or systems of FIG. 1 or 2, the query engine 144 or information management system 104 of FIG. 1, the query engines 244 or information management system 204 of FIG. 2, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
receiving, from a user device, a data query request that includes at least one search parameter;
searching for the at least one search parameter as being included in at least one data record within a plurality of files that are stored according to a hierarchical organizational structure, wherein
the hierarchical organizational structure includes at least one root and at least one tier including the plurality of files, and
each of the plurality of files includes the at least one data record;
determining whether a file of the plurality of files matches a portion of the at least one search parameter;
upon determining the file of the plurality of files matches the portion of the at least one search parameter, setting the file as a candidate file;
determining which record included by the candidate file includes the at least one search parameter, by:
generating a plurality of query processing threads associated with the query request,
for each respective query processing thread, determining a sub-portion of the candidate file, and
as each query processing thread generates resultant data, providing the resultant data to a result analyzer of one or more result analyzers;
generating, by the one or more result analyzers, query results from the resultant data; and
while continuing to generate the query results, streaming, to the user device, the query results as at least one query result becomes available and to start streaming before the query requests have been fully generated.

2. The method of claim 1, wherein parsing the candidate files starts after the discovery of one or more candidate files, but before the scanning of the plurality of files is completed; and
wherein generating query results starts after at least one resultant data is produced, but before parsing all of the candidate files has completed.

3. The method of claim 1, wherein the plurality of files includes at least one-hundred million data records; and
wherein a time between receiving the data query request and streaming either at least one query result or at least one query status report is less than 2 seconds.

4. The method of claim 1, wherein the hierarchical organizational structure dictates that directory names and file names include a particularly time-based naming scheme; and
wherein scanning includes examining a time-based portion of the directory names and file names to determine if each respective file is a candidate file.

5. The method of claim 1, wherein a read-only portion of the plurality of files that are stored according to a hierarchical organizational structure is stored in a first portion of a file hierarchy, and a readable-and-writable portion of the plurality of files is stored in a second portion of the file hierarchy.

6. The method of claim 5, wherein the hierarchical organizational structure defines that:
data associated with user sessions is stored by splitting the data into two groups, completed data and in-progress data, and
wherein completed data is stored using a time-based file structure that includes completed files limited in size and timeframe, and
wherein in-progress data is stored in individual in-progress files, each in-progress file being associated with an identifier.

7. The method of claim 5, wherein:
data related to web traffic in the hierarchical organizational structure is stored in a time-based file structure that includes files limited in size and timeframe.

8. The method of claim 1, wherein parsing the candidate files includes:
reading at least a portion of a metadata file associated with a respective candidate file,
wherein the metadata file includes a list of values included in a specified field within the associated candidate file.

9. The method of claim 1, further including:
responding to the query request with a query identifier that identifies the query resulting from the query request;
receiving from the user device, a stop query request that includes the query identifier; and
terminating the query before all query results have been streamed to the user device.

10. The method of claim 1, wherein generating query results includes:
summarizing the resultant data, as currently produced, to generate the query result; and
as new resultant data is produced, incorporating the new resultant data into the query result.

11. The method of claim 1, further comprising:
receiving a record to add to the plurality of files;
determining, based upon the hierarchical organizational structure, a file in which the record is to be stored; and
inserting the record into the determined file.

12. The method of claim 1, further comprising:
generating a plurality of insertion processing threads;
receiving a record that includes a plurality of fields to add to the plurality of files;
associating an insertion processing thread with the record;
formatting, via the associated insertion processing thread, the record and fields according to a predefined defined data schema, wherein formatting creates a formatted record; and
inserting, via the associated insertion processing thread, the formatted data record into a selected file of the plurality of files, wherein the selected file is determined based upon the hierarchical organizational structure.

13. The method of claim 1, further comprising:
receiving a record to add to the plurality of files;
determining if the record pertains to either atomic data or non-atomic data; and
if the record pertains to non-atomic data:
selecting a file of the plurality of files based upon the hierarchical organizational structure,
copying the file selected to a temporary file,
writing the record to the temporary file, and
overwriting the file selected with the temporary file.

14. The method of claim 13, wherein overwriting the file selected with the temporary file includes:
determining if, based on a set of predefined criteria, the file selected is to be made read-only, and
if so, moving the file selected to a read-only portion of the plurality of files as dictated by the hierarchical organizational structure.

15. The method of claim 1, wherein the hierarchical organizational structure defines that for each tenant of a multi-tenant computing system, only files associated with the respective tenant are stored within a respective partitioned portion of the plurality of files;
wherein the data query request includes an indication of one or more indicated tenants whose data is to be searched; and
wherein scanning a plurality of files includes scanning only the partitioned portions of the plurality of files associated with the indicated tenants.

16. An apparatus comprising:
a network interface configured to:
receive, from a user device, a data query request that includes at least one search parameter;
search for the at least one search parameter in at least one data record within a plurality of files that are stored according to a hierarchical organizational structure, wherein
the hierarchical organizational structure includes at least one root and at least one tier including the plurality of files, and
each of the plurality of files includes the at least one data record; and
a processor configured to:
determine whether a file of the plurality of files matches a portion of the at least one search parameter;
upon determining the file of the plurality of files matches the portion of the at least one search parameter, set the file as a candidate file,
determine which record included by the candidate file includes the at least one search parameter, by:
generating a plurality of query processing threads associated with the query request,
for each respective query processing thread, determining a sub-portion of the candidate file, and as each query processing thread generates resultant data,
providing the resultant data for result analysis, and
generate, via the result analysis, query results from the resultant data; and
wherein the network interface is also configured to:
while continuing to generate the query results, stream, to the user device, the query results after at least one query result becomes available and before the query requests have been fully generated.

17. The apparatus of claim 16, wherein the network interface is configured to:
receive a record that includes a plurality of fields to add to the plurality of files; and
wherein the processor is configured to:
execute a plurality of insertion processing threads,
associate an insertion processing thread with the record,
format, via the associated insertion processing thread, the record and the plurality of fields according to a predefined data schema, wherein formatting creates a formatted record, and
cause to be inserted, via the associated insertion processing thread, the formatted data record into a selected file of the plurality of files, wherein the selected file is determined based upon the hierarchical organizational structure.

18. The apparatus of claim 16, wherein the hierarchical organizational structure defines that for each tenant of a multi-tenant computing system, only files associated with the respective tenant are stored within a respective partitioned portion of the plurality of files;
wherein the data query request includes an indication of one or more indicated tenants whose data is to be searched; and
wherein the processor is configured to scan only the partitioned portions of the plurality of files associated with the indicated tenants.

19. A computer program product for storing and providing information, the computer program product being tangibly and non-transitorily embodied on a computer-readable medium and including executable code that, when executed, is configured to cause an apparatus to:
- receive, from a user device, a data query request that includes at least one search parameter;
- search for the at least one search parameter as being included in at least one data record within a plurality of files that are stored according to a hierarchical organizational structure, wherein:
  - the hierarchical organizational structure includes at least one root and at least one tier including the plurality of files, and
  - each of the plurality of files includes the at least one data record;
- determine whether a file of the plurality of files matches a portion of the at least one search parameter;
- upon determining the file of the plurality of files matches the portion of the at least one search parameter, set the file as a candidate file;
- determine which record included by the candidate file includes the at least one search parameter;
- generate resultant data based on the record that includes the at least one search parameter;
- generate, via result analysis, query results from the resultant data;
- stream, to the user device, the query results after at least one query result becomes available and before the query requests have been fully generated;
- generate a plurality of insertion processing threads;
- receive a record that includes a plurality of fields to add to the plurality of files;
- associate an insertion processing thread with the record;
- format, via the associated insertion processing thread, the record and fields according to a predefined data schema, wherein formatting creates a formatted record; and
- insert, via the associated insertion processing thread, the formatted data record into a selected file of the plurality of files, wherein the selected file is determined based upon the hierarchical organizational structure.

* * * * *

UNITED STATES PATENT AND TRADEMARK OFFICE
CERTIFICATE OF CORRECTION

PATENT NO. : 9,734,237 B2
APPLICATION NO. : 13/731211
DATED : August 15, 2017
INVENTOR(S) : Ginter Page 1 of 1

It is certified that error appears in the above-identified patent and that said Letters Patent is hereby corrected as shown below:

On the Title Page

In the figure, delete " 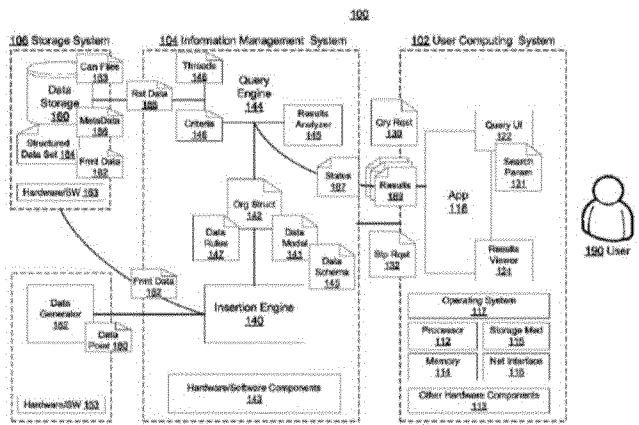 " and insert -- 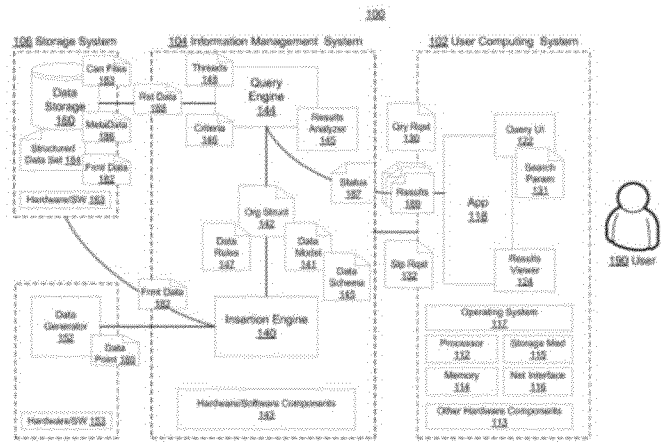 --, therefor.

On Page 2, Column 1, item (56), under "OTHER PUBLICATIONS", Line 6, delete "hapdoop," and insert -- hadoop, --, therefor.

Signed and Sealed this
Ninth Day of October, 2018

Andrei Iancu
*Director of the United States Patent and Trademark Office*